United States Patent [19]

Flora, Jr. et al.

[11] Patent Number: 5,168,748
[45] Date of Patent: Dec. 8, 1992

[54] LEAK SIMULATION DEVICE FOR STORAGE TANKS

[75] Inventors: Jairus D. Flora, Jr., Overland Park, Kans.; H. Kendall Wilcox, Blue Springs, Mo.

[73] Assignee: Midwest Research Institute, Kansas City, Mo.

[21] Appl. No.: 692,538

[22] Filed: Apr. 29, 1991

[51] Int. Cl.$^5$ .............................................. G01M 3/32
[52] U.S. Cl. ..................................... 73/49.2; 73/1 R; 73/865.6
[58] Field of Search ..................... 73/49.2, 40, 40.5 R, 73/1 G, 1 R, 865.6

[56] References Cited

U.S. PATENT DOCUMENTS

| | | | |
|---|---|---|---|
| 3,537,298 | 11/1970 | Kapff | 73/49.2 |
| 4,523,452 | 6/1985 | Brayman | 73/40 |
| 4,646,560 | 3/1987 | Maresca, Jr. et al. | 73/49.2 |
| 4,672,842 | 6/1987 | Hasselmann | 73/49.2 |

Primary Examiner—Hezron E. Williams
Assistant Examiner—Joseph W. Roskos
Attorney, Agent, or Firm—Shook, Hardy & Bacon

[57] ABSTRACT

A method and apparatus for simulating leakage from a liquid storage tank to test the accuracy of leak measurement instruments. An elongated pipe string formed by pipes connected end to end is extended into the tank. An end cap on the bottom of the pipe carries an inner cylinder which is smaller than the pipe and concentric with it. The inner cylinder is open at the top and, if it be an underground tank, may be loaded with fill material of the type that surrounds the tank. An orifice mounted to the end cap simulates a tank leak and allows liquid from the tank to flow through the backfill material into the pipe. A multiple orifice assembly may be remotely operated to change the orifice characteristics. The liquid in the pipe is collected for measurement to determine the leakage quantity.

17 Claims, 1 Drawing Sheet

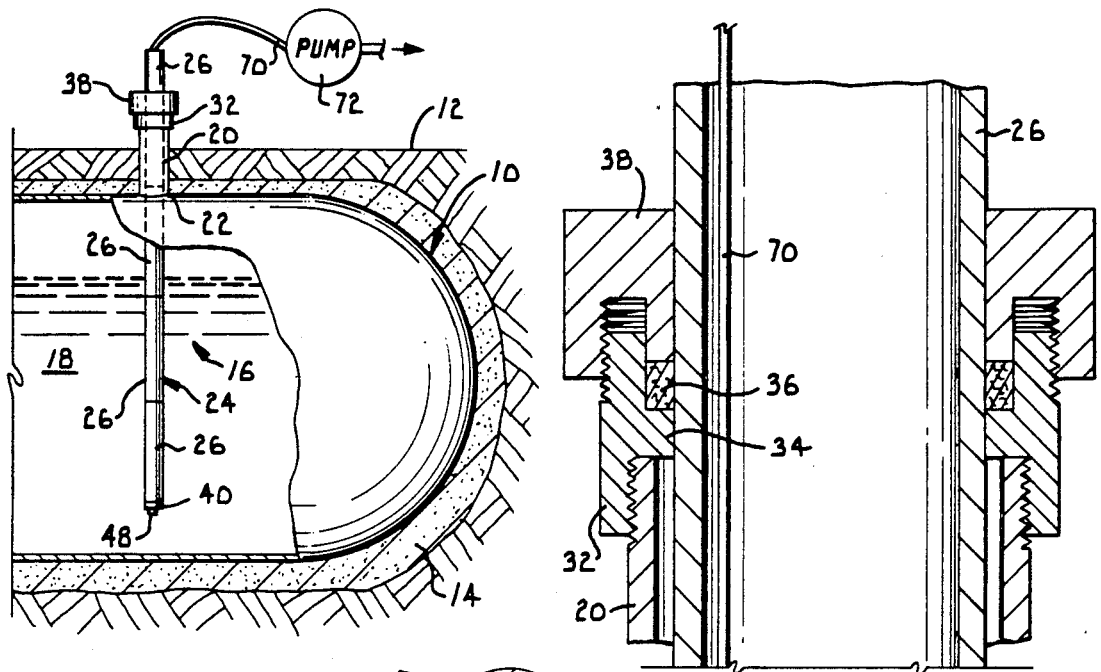
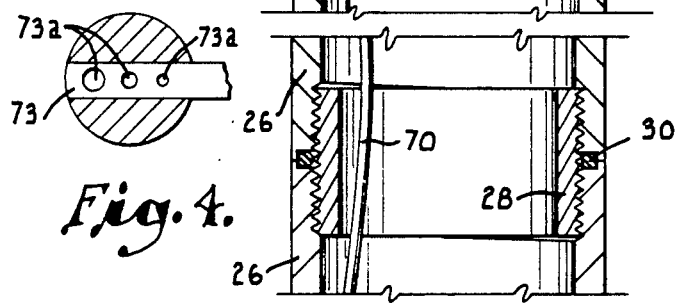
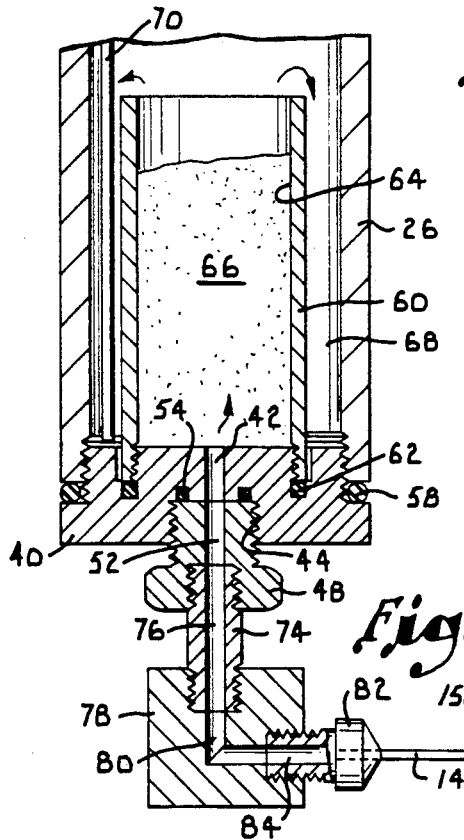
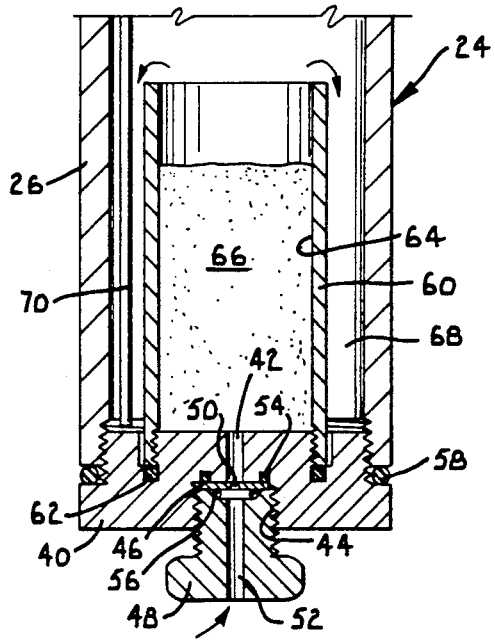
Fig. 1.
Fig. 4.
Fig. 3.
Fig. 2.

LEAK SIMULATION DEVICE FOR STORAGE TANKS

This invention relates generally to underground liquid storage tanks and more particularly to a method and apparatus for simulating the leakage of liquid from storage tanks.

Gasoline, petrochemicals of various types, and other liquids that are potentially harmful to the environment are often stored in large underground tanks. Due principally to environmental concerns, equipment has been developed for measuring the rate of leakage from an underground tank so that if excessive leakage is indicated, corrective measures can be taken. Devices of this type normally function by measuring volume changes of the liquid in the tank in order to determine the amount of liquid that is unaccounted for and thus assumed to have leaked from the tank.

In order to test whether leak measuring devices operate accurately, test devices have been proposed for simulating leakage so that the leak detector measurement can be compared to the simulated leakage, thus testing the accuracy of the leak measurement device. Previous leak simulators have involved the use of a pump that pumps liquid out of the tank at a constant rate. Although this technique can be a valid test of the ability of a device to measure a constant leak, actual leaks are seldom constant in rate and can vary widely depending upon various factors, including pressure, leak orifice size and geometry, and the fill material which surrounds the tank. Consequently, constant rate pumping techniques are inadequate to test the accuracy of a device to measure an actual tank leak. In addition, acoustical measurements and other techniques that are used by leak measurement devices rely on characteristics that are not reproduced by pumping liquid at a constant rate. Thus, pumping methods for simulating leakage are inapplicable to many types of leak measurement devices.

The present invention is directed to an improved method and apparatus for simulating leakage in a manner causing a simulated leak to respond to changes in conditions the same way as an actual leak would respond. The leak simulation techniques employed in carrying out the present invention take into account conditions such as pressure changes, changes in the orifice size and/or geometry, and the fill material around the tank.

In accordance with the invention, a pipe string may be assembled in whatever length is required by connecting a number of pipe sections together end to end. The string pipe is provided with a special collar that may be threaded onto a pipe nipple which is connected with the tank inlet port. The pipe string extends through the collar into the tank and may be moved up and down within the collar in order to vary the height of its lower end. Normally, the end of the pipe is located near the bottom of the tank where the head pressure of the liquid is greatest. A packing gland is threaded onto the pipe collar to retain packing against the pipe for an effective seal.

An end cap is threaded onto the bottom of the pipe, and an open top cylinder extends upwardly from the end cap inside of, and concentric to, the pipe. The inside cylinder provides a backfill chamber at the bottom of the pipe for holding soil, sand, gravel or another fill material similar to what surrounds the tank. Interchangeable orifices of different sizes and geometries may be provided, either by way of interchangeable orifice plates or interchangeable scientific needles that allow liquid from the tank to flow into the backfill chamber and through the backfill material into the pipe in a manner simulating leakage from the tank.

A flexible tube has its inlet end located in the annular space between the pipe and the inside cylinder which forms the backfill chamber. The liquid collected in the pipe may be pumped through the tube and into a container where its volume can be measured to determine the actual amount of leakage through the orifice. The orifice size and geometry can be varied by substituting different orifice plates or different needles, the pressure can be varied by moving the pipe up or down in the tank, and the fill material in the cylinder can be matched to the actual fill material around the tank in order to reproduce the conditions under which actual leakage would occur in the tank installation.

The leak simulator with multiple leak rates can be used to improve and document the accuracy of existing tank test methods. The use of the simulator allows one to provide independently measured leak rates in addition to the unknown leak rate of the tank being tested. By observing the response of the tank test equipment with no added leak rate, and with different sizes of added leak rates, the tank test equipment can be used to develop a calibration curve for the particular tank and test being performed. Use of this calibration function can improve the ability of the tank test to correctly identify the condition of the tank under test. This procedure is known as the method of additions, where addition of known leak rates to the unknown allows one to measure the unknown plus several different know quantities and so calculate the unknown rate more precisely.

In the accompanying drawings which form a part of the specification and are to be read in conjunction therewith and in which like reference numerals are used to indicate like parts in the various view:

FIG. 1 is a fragmentary sectional view showing an underground liquid storage tank equipped with a leak simulating device constructed according to a preferred embodiment of the present invention, with a portion of the tank broken away for illustrative purposes;

FIG. 2 is a fragmentary sectional view taken through the center of the leak simulating device on a vertical plane, with the break lines indicating continuous length of the pipe string;

FIG. 3 is a fragmentary sectional view similar to the lower part of FIG. 2 but illustrating a modified form of the invention in which the orifice plate is replaced by a scientific needle; and FIG. 4 is a fragmentary top plan view of a multi-way remotely operated value which can be used to control the flow of fluid into a chamber of the leak simulating device shown in FIG. 2.

Referring now to the drawings in more detail and initially to FIG. 1, numeral 10 generally designates an underground liquid storage tank of the type commonly used to store gasoline and other liquids. The tank 10 is buried beneath the ground level 12, and the excavation is filled in around the tank with a fill material 14 which may be sand, gravel, soil, or some other material.

The present invention provides a leak simulator which is generally identified by numeral 16 and which is used to simulate leakage of the liquid 18 from the tank 10 for the purpose of testing the accuracy of a leak measurement device that is provided to measure leakage from the tank.

A pipe nipple 20 is threaded at its lower end into a port 22 which is formed in the top of the tank 10. An elongated pipe string 24 has a smaller diameter than the nipple 20 and extends through the pipe nipple and through the port 22 into the interior of the tank 10. The pipe string 24 may be formed by a plurality of identical pipe sections 26 which are connected end to end. As best shown in FIG. 2, the ends of the pipe sections 26 are internally threaded, and the adjacent ends of the pipe sections are threaded onto an internal pipe coupling 28 at each pipe joint. An 0-ring 30 is provided at each pipe joint to provide a leak proof seal where the pipes are joined.

A collar 32 is threaded onto the top end of the pipe nipple 20 and has an inwardly projecting rib 34 which closely surrounds the pipe string 24. A graphite packing ring 36 seats on top of the rib 34 and is retained in place and compressed against the outside surface of the pipe string 24 by a packing gland 38 which is threaded down onto the collar 32.

Threaded into the bottom end of the lowermost pipe section 26 is a brass end cap 40 having a central passage 42 leading to an internally threaded bore 44 in the end cap. A flat orifice plate 46 is held against the shoulder formed at the intersection between passage 42 and bore 44 by a brass bolt 48. The orifice plate 46 has a central orifice 50 which is aligned with passage 42 and with another passage 52 which is formed longitudinally through the bolt 48. An O-ring 54 provides a seal between the orifice plate 46 and the end cap 40, and another and smaller O-ring 56 provides a seal between the orifice plate 46 and the bolt 48. The bolt 48 is threaded into the bore 44 in order to hold the orifice plate 46 in place and to compress the O-rings 54 and 56. Another O-ring 58 provides a seal between the bottom end of the lower pipe section 26 and the end cap 40.

The orifice 50 can have virtually any desired size and geometry. It is contemplated that interchangeable orifice plates will be provided with the leak simulating device, with the different orifice plates having orifice diameters ranging from approximately 0.001 inch to 0.01 inch. It is also contemplated that the orifice plates may be intentionally corroded near the center in order to produce holes that are typical of actual corrosion in a storage tank wall. The orifice plates may be constructed of metal, fiberglass reinforced plastic (which is damaged to provide a hole of the type found in actual fiberglass tanks), or a porous ceramic plate through which fluid can seep in a manner similar to leakage through a corroded tank wall. The treatment of the different orifice plates can thus vary widely in order to provide a simulation of a leak in an actual tank wall, and the orifice plate used in a particular application can be selected according to the type of tank leak that is contemplated to be the most likely under the particular conditions that are encountered by the tank.

Threaded to the top of the end cap 40 and extending within and concentric to the lower pipe section 26 is an open top cylinder 60 which may be constructed of the same type of material as the pipe sections 26 (preferably aluminum). The threaded lower end of the cylinder 60 compresses an O-ring 62 which provides a liquid tight seal between the cylinder 60 and the end cap 40. A backfill chamber 64 is provided inside of the cylinder 60. The backfill chamber 64 receives a suitable backfill material 66 which is preferably the same material as the fill material 14 which surrounds the storage tank 10. Typically, the backfill material 66 will be either wet or dry sand, gravel, earth or some combination of earth, sand and/or gravel. Preferably, the top of the backfill material is well below the open top of cylinder 60 in order to prevent the backfill material from washing over the top of the cylinder.

The inside cylinder 60 is somewhat smaller in diameter than the pipe section 26, and an annular space 68 is thus presented between the outside of cylinder 60 and the inside of the lower pipe section 26. A flexible tube 70 extends into the annular space 68 with the lower inlet end of tube 70 located in the space 68 adjacent to the end cap 40. The flexible tube 70 extends through the entire length of the pipe string 24 and out of the tank 10 through the open top end of the upper pipe section 26, as best shown in FIG. 1. A conventional pump 72 (FIG. 1) connects with the discharge end of the tube 70 and may be operated to pump liquid out of the space 68 and through the tube 70 to a suitable container (not shown) so that the amount of liquid that is pumped into the container can be accurately measured.

In use of the leak simulating device 16, the initial pipe section 26 first receives the end cap 40 which (and cylinder 60) is threaded into the bottom end of the pipe section with the bolt 48 threaded fully into the end cap to secure the selected orifice plate 46 in place. The initial pipe section 26 is extended through the packing gland 38, the collar 32 and the pipe nipple 20 until its top end is located near the top of the packing gland 38. It is noted that the pipe sections can slide longitudinally up and down inside of the head assembly of the device. The next pipe section may then be connected with the initial pipe section by means of the pipe coupling 28, and the pipe is extended downwardly again at this time. Additional pipe sections 26 can be added as desired until the end cap 40 is immersed in the liquid 18 at the desired depth which is normally near the bottom of the tank 10 where the head pressure is the greatest.

A suitable remote operated valve (not shown) is provided to open and close passage 52. When the device has been positioned as desired, the valve is opened to expose passage 52 to the liquid in the tank. Then, the liquid is able to flow through passage 52, through the small orifice 50, through passage 42 and through the fill material 66 until it rises to the top of the inside cylinder 60 and overflows into the annular space 68 and eventually up inside of pipe 24. It is notes that the liquid will continue to leak through the orifice 50 until the level in the pipe 24 has reached the level of the liquid in the tank 10.

Actually, it may be preferred to utilize a multi-way remotely operated valve 73 as shown in FIG. 4 to control the flow of fluid into chamber 64. The valve has a plurality of individually selectable different orifices 73a so that any one of the orifices can be utilized at any desired time to control the flow of fluid into the chamber. This permits the operator to select whatever simulated leak rate that may be desired.

While the liquid is leaking into the pipe 26, the leak measurement device with which tank 10 is equipped is operated to provide a measurement of the amount of leakage that is taking place. The valve can be closed at any point in order to cut off the flow into passage 52. Then, the pump 72 is operated to pump the liquid out of pipe 26 until the only liquid remaining is inside of the inner cylinder 60. The liquid is pumped into and collected in a suitable container and is measured either by weight or volume or both. Since the amount of liquid in the cylinder 60 is known, the total amount of liquid that leaked from the tank 10 into the leak simulating device is known from the measurement of the liquid collected in the container. This quantity can be compared with the quantity measured by the leak measurement device in order to test its accuracy.

Because the pipe 24 can slide upwardly and downwardly within the head of the device located on top of the tank 10, the end cap 40 can be raised or lowered as desired to vary the pressure to which the orifice 50 is subjected. Consequently, the leak simulating device 16 can be used to test the accuracy of the leak measuring instrument under varying pressures. Additionally, the size and geometry of the orifice 50 used at any particular time can be changed by substituting different orifice plates 46 in order to determine the accuracy of the leak measuring instrument under condition of different orifice size and/or geometry. By allowing the pressure and orifice size and geometry conditions to be varied as desired, and by providing the backfill material 66 which is identical to the material 14 that surrounds the actual tank that is undergoing testing, the leak simulating device 16 is able to accurately reproduce what would take place if an actual leak in the tank wall developed, and the leak measuring device can thus be tested to determine its accuracy under actual leakage conditions.

FIG. 3 illustrates a modified embodiment of the invention which is substantially identical to the device previously described, except that the orifice plate 46 is replaced by a scientific needle or length of capillary tubing having a longitudinal passage 150 which functions as the orifice. Again, different length needles 146 can be interchanged with one another, and the orifice size provided by the different needles can vary through the range 0.006 inch to 0.018 inch, for example.

In the embodiment shown in FIG. 3, the bolt 48 is threaded against the O-ring 54, and a pipe nipple 74 is threaded into the head of the bolt 48. The pipe nipple 74 has a passage 76 that aligns with the passage 52 in the bolt 48. A brass block 78 is threaded onto the lower end of the pipe nipple 74 and is provided with an L shaped passage 80 that aligns with the passage 76. A fitting 82 which holds the scientific needle 146 is threaded into the side of the block 78, with a passage 84 in the fitting disposed in alignment with passage 80 and with the orifice passage 150 provided by the needle 146.

The embodiment of the invention shown in FIG. 3 operates in substantially the same manner described previously with the passage 150 serving as the orifice through which liquid from the tank is able to leak slowly from the tank into the leak simulating device. Again, different orifice sizes can be used by interchanging different needles 146 to simulate leakage through different leak hole sizes. A suitable valve (not shown) may be provided either in the block 78 or elsewhere in order to permit the simulated leak passage to be opened and closed as desired. A multiway remote valve may be provided in the cap 40 allowing several assemblies with different orifices to be used and selected remotely.

The leak simulating device can also be used to simulate flow into the tank 10, such as in the case of ground water leaking into the tank due to a hydrostatic pressure around the tank that is greater than the internal pressure. In order to simulate leakage into the tank, a measured quantity of test fluid can be deposited in the pipe string 24, and the pipe can be positioned with the end cap 40 at a height where the head pressure of the liquid inside of the pipe 16 is greater than the head pressure applied to the pipe by the liquid 18 in the tank. Under these conditions, the test fluid will leak through the orifice 50 (or the needle passage 150), thus resulting in an increase in the volume of the liquid 18 in the tank. Since the amount of test liquid that ultimately leaks into the tank is known, the device can be used to verify the accuracy of instruments that are used to detect and measure water infiltration into underground tanks such as the tank 10. Again, the leakage takes place through the backfill material 66 which is identical to the actual fill material 14, and the test conditions thus accurately reproduce the actual conditions that exist. Consequently, the flow into the tank from the leak simulator displays the same characteristics as would actual infiltration of ground water surrounding the tank.

It will be readily understood by those skilled in the art that the apparatus of this invention is not necessarily limited to use in connection with underground tanks. On the contrary, the apparatus may be utilized in simulating leaks in above ground tanks as well.

Also, it will be recognized that the apparatus described herein is well suited for use to improve and document the accuracy of existing tank test methods. It permits one to utilize the "method of additions" heretofore described for such testing. Thus, known leak rates are added to unknown leak rates to allow one to measure the unknown plus several different known quantities. This permits relatively precise calculation of the unknown leak rate.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. Leak simulating apparatus for a liquid storage tank, said apparatus comprising:
    an enclosed chamber in the tank for collecting liquid from the tank;
    an orifice exposed to the liquid in the tank and providing ingress of liquid to said chamber;
    a conduit having one end disposed in said chamber and another end located externally of the tank; and
    pump means for pumping liquid through said conduit for collection of the liquid that enters the chamber through said orifice to thereby collect for measurement the simulated leakage through the orifice.

2. Apparatus as set forth in claim 1, wherein said enclosed chamber comprises an elongate pipe extendable downwardly into the tank, said pipe having a bottom end for immersion in the liquid in the tank.

3. Apparatus as set forth in claim 2, including means for sealing said pipe to the tank in a manner allowing the pipe to be raised and lowered to vary the height of the bottom end of the pipe.

4. Apparatus as set forth in claim 2, including an open top backfill chamber in said pipe adjacent the bottom thereof for receiving backfill material simulating the material around the tank, said orifice communicating with said backfill chamber through the bottom end of the pipe.

5. Apparatus as set forth in claim 4, wherein said backfill chamber is arranged to present an annular space between the outside of the backfill chamber and the inside of the pipe, said one end of the conduit being disposed in said annular space.

6. Apparatus as set forth in claim 4, including:
an end cap secured on and sealed to said bottom end of the pipe, said end cap presenting a passage therethrough communicating with the interior of said backfill chamber;
an orifice plate presenting said orifice therein; and
means for releasably securing said orifice plate to said end cap with the orifice in registration with said passage.

7. Apparatus as set forth in claim 4, including:
an end cap secured on and sealed to said bottom end of the pipe, said end cap presenting a passage therethrough communicating with the interior of said backfill chamber;
a capillary tube member presenting said orifice therein; and
means for releasably securing said capillary member with the orifice thereof disposed in communication with said passage.

8. Leak simulating apparatus for an underground liquid storage tank, said apparatus comprising:
an elongate pipe extendable into the tank and presenting an enclosure for holding liquid, said pipe having a bottom end;
an open topped chamber within said pipe adjacent the bottom end thereof for holding backfill material simulating the material around the tank; and
orifice means adjacent the bottom of said pipe for simulating a leak in the tank, said orifice means providing communication between the tank and the interior of said chamber to allow liquid flow therebetween simulative of a leak in the tank, whereby the quantity of liquid in the pipe represents the quantity of simulated leakage through the orifice.

9. Apparatus as set forth in claim 8, including means for sealing said pipe to the tank in a manner to allow the pipe to slide up and down to vary the depth of immersion of said bottom end.

10. Apparatus as set forth in claim 8 wherein said orifice means includes a remotely operable multiple orifice assembly, including a plurality of orifices of different characteristics selectively operable to place any selected one of said orifices in disposition for providing said communication between the tank and the interior of said chamber, whereby the quantity of flow to the chamber to simulate said leak may be varied.

11. Apparatus as set forth in claim 8, including:
a conduit extending in the pipe and having one end disposed adjacent the bottom end of the pipe between the outside of said chamber and the inside of said pipe, said conduit having another end located externally of the tank; and
means for pumping liquid through said conduit from said one end to said other end for collection of the liquid in the pipe for measurement.

12. Apparatus as set forth in claim 8, including:
an end cap secured on and sealed to said bottom end of the pipe, said end cap presenting a passage therethrough communicating with the interior of said backfill chamber;
an orifice plate presenting said orifice therein; and
means for releasably securing said orifice plate to said end cap with the orifice in registration with said passage.

13. Apparatus as set forth in claim 8, including:
an end cap secured on and sealed to said bottom end of the pipe, said end cap presenting a passage therethrough communicating with the interior of said backfill chamber;
a needle member presenting said orifice means therein; and
means for releasably securing said needle member with the orifice thereof disposed in communication with said passage.

14. A method of simulating leakage of liquid from an underground tank, said method comprising the steps of:
extending an elongate pipe into the liquid in the tank;
providing a chamber in said pipe for collection of liquid;
permitting liquid in the tank to flow through an orifice of known characteristics which simulates a leak in the tank, whereby liquid in the tank leaks through the orifice into the chamber in the pipe; and
measuring the quantity of liquid that is collected in the chamber to provide a measurement of the quantity of simulated leakage from the tank.

15. The method of claim 14, including the step of pumping the liquid from the pipe to the exterior of the tank prior to said measuring step.

16. The method of claim 14, including the step of varying the depth at which the orifice is immersed in the liquid in the tank to vary the pressure to which the orifice is subjected.

17. The method of claim 14, including the steps of:
recording the amount of leakage of liquid into or from said tank as measured by tank leakage test equipment;
recording the measurement or measurements by said test equipment of the combined amount of leakage and flow of measured amounts of liquid into said chamber through one or more orifices of known characteristics; and
utilizing the recorded amounts to interpret the readings from said test equipment, thereby enhancing the accuracy of said equipment in measuring said leakage.

* * * * *